(12) United States Patent
Droste et al.

(10) Patent No.: US 12,035,794 B2
(45) Date of Patent: Jul. 16, 2024

(54) APPARATUS AND METHOD FOR FORMING A MULTILAYER COSMETIC PRODUCT BY MEANS OF A FLEXIBLE CORE

(71) Applicant: WECKERLE GMBH, Weilheim (DE)

(72) Inventors: Sven Droste, Peibenberg (DE); Ann-Kristin Commes, Weilheim (DE); Markus Hell, Eglfing (DE); Fabian Rankl, Kinsau (DE)

(73) Assignee: Weckerle GmbH, Weilheim (DE)

( * ) Notice: Subject to any disclaimer, the term of this patent is extended or adjusted under 35 U.S.C. 154(b) by 255 days.

(21) Appl. No.: 17/503,974

(22) Filed: Oct. 18, 2021

(65) Prior Publication Data
US 2022/0117376 A1    Apr. 21, 2022

(30) Foreign Application Priority Data
Oct. 21, 2020 (EP) ................. 20202941

(51) Int. Cl.
*A45D 40/16* (2006.01)
(52) U.S. Cl.
CPC .................. *A45D 40/16* (2013.01)
(58) Field of Classification Search
CPC ................... A45D 40/16
See application file for complete search history.

(56) References Cited

U.S. PATENT DOCUMENTS

| | | | |
|---|---|---|---|
| 4,093,175 A * | 6/1978 | Putzer | B28B 7/306 249/153 |
| 6,530,865 B2 * | 3/2003 | Held | B32B 1/08 473/578 |

(Continued)

FOREIGN PATENT DOCUMENTS

| | | |
|---|---|---|
| EP | 2006063 A1 | 12/2008 |
| EP | 3219363 A1 | 9/2017 |

(Continued)

OTHER PUBLICATIONS

Extended European Search Report for European Patent Application No. EP 20202941, mailed Apr. 20, 2021.

*Primary Examiner* — Robert B Davis
(74) *Attorney, Agent, or Firm* — Gregory D. DeGrazia; Miller, Canfield, Paddock and Stone (57) ABSTRACT

The present invention relates generally to an apparatus as well as a method for forming a cosmetic product, in particular an apparatus as well as a method for forming a lipstick mine, from at least two pasty masses. Here, the apparatus according to the invention comprises a flexible mold and a flexible core adapted to be moved into the flexible mold and to be arranged in a first position at least partially inside the flexible mold, and in a second position outside the flexible mold. The method according to the invention comprises moving the flexible core into the first position, filling a first pasty mass into a first cavity, the first cavity being formed between the flexible mold and the flexible core when the flexible core is in the first position, moving the flexible core into the second position, filling a second pasty mass into a second cavity, the second cavity being formed in the first pasty mass when the flexible core is moved into the second position, and deforming the pasty masses from the flexible mold.

12 Claims, 5 Drawing Sheets

(56) References Cited

U.S. PATENT DOCUMENTS

| | | | |
|---|---|---|---|
| 2007/0295887 A1* | 12/2007 | Kuo ................. | A45D 40/16 |
| | | | 249/137 |
| 2009/0020912 A1* | 1/2009 | Klein ................ | B29C 33/485 |
| | | | 264/271.1 |
| 2014/0130457 A1* | 5/2014 | Lebert ............... | A45D 40/16 |
| | | | 53/510 |
| 2014/0151927 A1* | 6/2014 | Gilg ................. | A61Q 1/06 |
| | | | 264/313 |

FOREIGN PATENT DOCUMENTS

| | | | |
|---|---|---|---|
| EP | 3701831 A1 * | 9/2020 | |
| WO | 2018206883 A1 | 11/2018 | |

* cited by examiner

APPARATUS AND METHOD FOR FORMING A MULTILAYER COSMETIC PRODUCT BY MEANS OF A FLEXIBLE CORE

PRIOR APPLICATIONS

The present application claims priority to European Patent Application No. 20202941.9 filed on Oct. 21, 2020, the contents of which are included herein by reference.

TECHNICAL FIELD

The present invention relates generally to an apparatus as well as a method for forming a cosmetic product, in particular an apparatus as well as a method for forming a lipstick mine, from at least two pasty masses.

BACKGROUND

In known methods for forming a cosmetic product, in particular for forming a lipstick mine, pasty masses to be formed are filled into a mold in a hot, liquid state with the aid of a filling apparatus. The filled pasty mass can then cool down or be cooled down in the mold in order to solidify, so that the pasty mass assumes the inner configuration of the mold. The desired spatial design of the pasty mass is thus achieved by the inner configuration of the mold. The solidified pasty mass can then be removed from the mold, for example, with the aid of a removal apparatus. By means of this technique, however, only lipstick mines with one type of pasty mass can be produced.

In the prior art, however, techniques are also known by which lipstick mines can be produced from two or more pasty masses. These lipstick mines consisting of several pasty masses can also be referred to as multilayer lipstick mines. To produce these, a reducer piece is first inserted into the mold. This reducer piece changes the inner configuration of the mold and forms a first cavity between the outer wall of the reducer piece and the inner wall of the mold. Therefore, the reducer piece can also be referred to as a core that is inserted into the mold. The first cavity formed between the core and the inner wall of the mold can then be filled with a first pasty mass. When this first pasty mass has cooled down and solidified, the core can be moved out of the mold. The core then leaves a second cavity into which a second pasty mass can be filled. The second pasty mass can then cool down or be cooled down and solidify in the second cavity. This results in a multilayer lipstick mine, characterized in that the inner second pasty mass is surrounded or encased by the outer first pasty mass. It can also be said that the second pasty mass is the interior pasty mass, whereas the first pasty mass is the exterior pasty mass. Methods and corresponding apparatus for producing such multilayer lipstick mines are described, for example, in DE 44 42 197 C1, U.S. Pat. Nos. 4,291,018 and 7,208,168.

However, the methods and apparatus described in the prior art use rigid cores with rigid outer geometries, with a configuration that tapers mostly in the direction of the mold. This has the disadvantage that the exterior first pasty mass and the interior second pasty mass cannot assume any arbitrary form. The core must be configured in such a way that it does not damage the first pasty mass when it is moved out of the mold.

For the above-mentioned reasons, the methods and apparatus known in the prior art can only be used to produce smoothly closing layers of pasty masses. In principle, however, there is a need for method and apparatus which permit more complicated configurations of the second pasty mass, in particular of the inner pasty mass. A higher degree of design freedom in the production of multi-component lipstick mines would be desirable. In particular, it would be desirable to produce patterns or undercuts within the pasty masses. In such patterns or undercuts, the pasty masses form interlocking structures which do not close off smoothly over a large area. For example, it may be desirable for the corporate brand or a product identifier of the manufacturing company to appear as a pattern within one or more of the pasty masses. This corresponds to engravings located on the surface and/or within the lipstick mine.

SUMMARY

This task is solved with the apparatus and the method of the independent claims. Preferred embodiments are explained in the dependent claims.

An apparatus according to the invention for forming a cosmetic product, in particular a lipstick mine, consisting of at least two pasty masses, comprises a flexible mold and a flexible core. Thereby, the flexible core is adapted to be moved into the flexible mold and to be arranged in a first position at least partially inside the flexible mold and to be arranged in a second position outside the flexible mold. In the first position, in which the flexible core is arranged at least partially inside the flexible mold, the flexible core together with the flexible mold forms a first cavity. In this case, the first cavity is formed between the inner wall of the flexible mold and the outer wall of the flexible core. It may also be said that the first cavity is formed between the facing walls of the flexible core and of the flexible mold. The first position may represent the deepest immersion of the flexible core into the flexible mold. A first pasty mass may be filled into the first cavity formed between the flexible core and the flexible mold. After at least partial solidification of the first pasty mass in the first cavity, the flexible core is moved to the second position. The second position may indicate the state in which the flexible core is completely removed from the flexible mold. This movement of the flexible core into the second position can be optimized in terms of process technology by adjusting the deforming angle. This means that the angle at which the flexible core is pulled out of the flexible mold is optimized in such a way that the flexible core damages the first pasty mass as little as possible. For example, the deforming angle can be selected so that it points away from the pattern, i.e. only the smooth surface of the flexible core touches the first pasty mass during deforming, whereas the surface with the design pattern, no longer touches the first pasty mass. When the flexible core is moved out of the first pasty mass, it reveals a second cavity which corresponds in configuration to the outer configuration of the flexible core. For example, a desired surface texture of the lipstick material can be achieved by forming the surface of the flexible core used. For example, an amorphous core surface automatically creates a non-brilliant appearance of the lipstick surface or that area of the lipstick that was in contact with the core surface during manufacturing. However, any patterns, shapes, logos, etc. are conceivable, which can be arranged on the surface of the flexible core and whose negative is then reflected in the first pasty mass. Because the core is flexible, it can deform when moved to the second position so that the flexible core does not damage the first pasty mass. This deformation can happen independently or in an assisted way. In the case of independent deformation, the flexible core is configured to be softer than the first pasty mass. Thus, in this case, the deformation is accomplished by the flexible core sliding along the first pasty mass and being compressed when the flexible core is moved to the second position without damaging the first pasty mass. This independent deformation may also be referred to as passive elastic deformation caused by external forces. If the flexible core is configured to be harder relative to the first pasty mass, assisted deformation may be necessary. In this case, a means can be used to ensure that the external shape of the flexible core changes. This change may occur before and/or during movement to the second position. The change may be given, for example, by contraction of the flexible core.

With the apparatus according to the invention, it is possible for the first time to produce lipstick mines with complex patterns, undercuts and logos from at least two pasty masses.

The person in the art is aware that even if the apparatus described herein includes only one flexible core, the apparatus can in principle also comprise several different flexible cores. In such a case, the flexible cores may comprise different diameters such that the first flexible core is the largest one and the last flexible core is the smallest one. The cavities located between successive cores then form additional cavities that can be filled with additional pasty masses. Thus, lipstick mines can be created that have undercuts and consist of more than two pasty masses.

In a preferred embodiment of the apparatus according to the invention, the two pasty masses used may differ in the type of chemical composition, color, transparency, viscosity, scent or other properties. The two pasty masses may differ in all properties or only in one property. For example, the first pasty mass may be transparent. This allows a view of the second pasty mass within the lipstick mine. In particular, a pattern imprinted on the second pasty mass is thus visible from the outside. The pasty masses may comprise wax, or a mixture of different waxes. In particular, the compositions of waxes for the first and second pasty masses can differ in such a way that the first pasty mass has a higher melting temperature, e.g. 20° C. to 30° C. (68° F. to 86° F.) higher, than the second pasty mass. This can prevent the first pasty mass from melting again in the cooled solidified state if it comes into contact with the second pasty mass in the heated liquid state.

In a preferred embodiment of the apparatus according to the invention, the flexible core may be hollow inside. In this case, hollow means that the flexible core comprises a cavity which is an internal volume which can be filled with a gas or air. The hollow flexible core is easier to deform compared to a solid, rigid core. The deformation of the flexible core can be done passively or actively. In the case of passive deformation of the flexible core, a change in shape of the flexible core occurs due to mechanical external action during a movement of the flexible core. In an active deformation of the flexible core, the change in shape of the flexible core occurs by active means that cause the deformation. For example, the active deformation may be accomplished by applying a change in positive pressure to the hollow flexible core. For example, the hollow flexible core may be pressurized in the first position to provide some stability to the flexible core. Before or when moving to the second position, the pressure may be released, allowing the flexible core to deform. To further assist the deformation, negative pressure may also be applied so that the hollow flexible core contracts, thereby causing the deformation. The pressurization can be accomplished by opening the interior volume of the hollow flexible core. Gas or air may be introduced into the inner volume of the flexible core through the opening. The inner volume of the flexible core may be at ambient pressure or at positive and negative pressure, relative to ambient pressure. The pressure difference between pressure in the inner volume of the flexible core and ambient pressure exerts forces on the flexible core, which cause the flexible core to expand or contract. Thus, when pressure or negative pressure is applied to the hollow flexible core, it is exploited that the flexible core expands or contracts. Here, expansion and contraction are used in the sense that the outer diameter of the flexible core, i.e. the diameter measured on the side facing the mold, is larger in the expanded state than in the contracted state. If the pressure inside the flexible core is equal to the ambient pressure, the diameter of the flexible core comes to lie between the diameter in the expanded state and the diameter in the contracted state. Such an expansion behavior of the material of the flexible core ensures that for retracting the flexible core, i.e. moving the flexible core to the second position, the flexible core can in principle be reduced in size, which makes the retraction much easier, since the size of the flexible core before retraction is larger than at the time of retraction. A reduced size of the flexible core at the time of retraction also allows the flexible core to be retracted without damaging the first pasty mass. Advantageously, the material of the flexible core is designed in such a way that the same volume shape of the flexible core is always obtained at the same internal pressure and the same ambient pressure. This ensures a reproducible reuse of the flexible core and thus a consecutive production of identical lipstick mines with the same flexible core.

In another preferred embodiment of the apparatus according to the invention, the apparatus may comprise a rigid mandrel adapted to be moved at least partially into the hollow flexible core. The geometry of the interior of the hollow flexible core is substantially the same as that of the rigid mandrel. It can also be said that the interior of the hollow flexible core is complementarily equipped to the rigid mandrel to at least partially accommodate it. Moving into the flexible core may occur before or while the flexible core is in the first position. The rigid mandrel can provide stabilization of the flexible core so that it does not move too much when the first pasty mass is filled to create a defined first cavity. Once the first pasty mass has been filled into the first cavity between the flexible mold and the flexible core, and has solidified in the first cavity, the rigid mandrel can be retracted so that the flexible core can subsequently be moved to the second position without damaging the first pasty mass. The rigid mandrel may also be referred to as a support mandrel due to its function of supporting the flexible core at least temporarily. The outer diameter of the rigid mandrel may be slightly less than the inner diameter of the hollow flexible core. For example, there may be an annular gap between the flexible core and the support mandrel. Thus, it can be said that there is a gap between the inner wall of the flexible core, i.e., the wall facing the rigid mandrel, and the outer surface of the rigid mandrel, i.e., the surface facing the flexible core. This gap or annular gap may be rotationally symmetric. For example, the annular gap can have a width of about 0.1 mm. The annular gap allows the rigid mandrel to move more easily relative to the flexible core, i.e. to be moved into and out of it. When the flexible mold is cooled together with the flexible core pulled over the support mandrel, the ingredients of the first pasty mass contract and the flexible core pulls toward the rigid mandrel. As a result, the flexible core is detached from the first pasty mass and can then be moved to the second position without damaging the cooled down first pasty mass. The annular gap thus facilitates non-destructive retraction of the flexible core to the second position. In addition to the support mandrel, the application of a pressure change already described above can also occur.

In a further preferred embodiment of the apparatus according to the invention, the flexible core may comprise a pattern on its outer wall, that is, on the wall facing the mold. The pattern may thereby be formed by at least one recess in the flexible core and/or by at least one protrusion. As a result, a protrusion and/or a recess is formed in the first pasty mass after the first pasty mass has been filled in. In other words, the pattern on the outer wall of the flexible core acts as a negative relief for a positive relief imprinted in the first pasty mass. After filling the second pasty mass, exactly the same pattern is formed on the surface of the second pasty mass as on the flexible core, since the second pasty mass now fills the same volume as the flexible core inserted into the flexible mold.

In a further preferred embodiment of the apparatus according to the invention, the flexible core may contact the flexible mold in the first position at least at one location. This is convenient if the second pasty mass is to extend to the surface of the lipstick mine at the at least one location. In addition, contacting the flexible mold by the flexible core is convenient for supporting or accurately, reproductively positioning the flexible core relative to the flexible mold. For example, the flexible mold may include means for positioning the flexible core. This means for positioning the flexible core may be configured, for example, as a protrusion of the bottom of the flexible mold toward the interior of the flexible mold. The protrusion may be configured to snugly receive the lower tip of the flexible core. For example, for this purpose, the protrusion may have an annular shape in which the inner diameter of the annular shape substantially corresponds to the outer diameter of the lower tip of the flexible core. The portion of the flexible core referred to herein as the tip is the lower portion of the flexible core facing and/or contacting the flexible mold in the first position.

In another preferred embodiment of the apparatus according to the invention, the flexible core may be formed from an elastomer. Materials from the elastomer groups LSR, RTV and HTV are used. The molds/cores have a shore hardness in the range of about 20-40 Shore A.

In another preferred embodiment of the apparatus according to the invention, the flexible core may comprise a coating on its surface. Here, the surface of the flexible core refers to the surface of the flexible core facing the flexible mold. The coating may be configured to facilitate release of the first pasty mass when the flexible core is pulled out of the flexible mold. In particular, the coating may be flexible, meaning that it does not detach from the surface of the flexible core when the flexible core changes shape. The coating may also reduce the coefficient of friction between the first pasty mass and the flexible core, allowing the flexible core to be easily moved out of the first pasty mass and into the second position. However, the use of coatings or mold release agents that facilitate release of the flexible core from the pasty mass can also be omitted. This is advantageous in the production of natural cosmetics, for which the conventional mold release agents are not permitted.

In another preferred embodiment of the apparatus according to the invention, the apparatus may comprise a means for moving the flexible core to the first and second positions. The first position describes the state of the flexible core moved into the flexible mold, whereas the second position describes the state of the flexible core moved out of the flexible mold. In this context, the moved-out state of the flexible core can be characterized by the fact that there is no contact of the flexible core with the pasty masses or with the flexible mold.

In a further preferred embodiment of the apparatus according to the invention, the apparatus may comprise means for filling the first pasty mass into the first cavity, wherein the first cavity is formed between the flexible mold and the flexible core when the flexible core is in the first position. The means for filling the first pasty mass may include a needle-like tip that includes an opening through which the first pasty mass exits.

In another preferred embodiment of the apparatus according to the invention, the apparatus may comprise means for filling the second pasty mass into the second cavity, the second cavity being formed in the first pasty mass when the flexible core is in the second position. The means for filling the second pasty mass may include a needle-like tip that includes an opening through which the second pasty mass exits. The means for filling the second pasty mass may be the same means as for filling the first pasty mass. If the same means for filling is used for filling both pasty masses, it is conceivable that a filling tip has two channels with two adjacent openings. This has the advantage that filling channels are independent of each other and, for example, do not have to be cleaned when the other pasty mass is to be filled in. However, it is also possible that two different, possibly identical, means are used for filling the two pasty masses. In particular, it is possible that the flexible core itself constitutes the means for filling the second pasty mass. For this purpose, there may be an opening at the tip of the flexible core, from which the second pasty mass exits into the second cavity when the flexible core is retracted.

In a further preferred embodiment of the apparatus according to the invention, the apparatus may comprise a means for deforming the pasty masses. Once the composite of first and second pasty masses has solidified, the composite can be removed from the flexible mold. For this purpose, a gripping mechanism is required which can grip the composite of first and second pasty masses as non-destructively as possible. For this purpose, it is possible for the composite of first and second pasty masses to be gripped by a bell-shaped suction apparatus and then pulled upwards. This leaves the flexible mold empty. In addition, it is possible that the composite of first and second pasty masses is removed from the flexible mold by means of a conventional removal method. In particular, the conventional removal method may include a basket removal, in which the solidified pasty mass is gripped by means of a basket, which is an exact fit with respect to the solidified pasty mass, and which is inserted directly into a newly produced lipstick during subsequent lipstick production. For example, the basket may be made of plastic.

In another preferred embodiment of the apparatus according to the invention, the apparatus may comprise a base plate with geometric features that allow centering and fixing of the flexible core. For reproducible production of similar lipstick mines, it is necessary that the flexible core is always brought back into the same relative position with respect to the flexible mold. It is true that, in principle, the flexible mold can be locked in place and the means for moving the flexible core can be positioned with millimeter precision using stepper motors. However, once selected, the position must also be stable during the filling process with the first pasty mass. For this purpose, it is useful to provide the flexible mold with a base plate which comprises geometric features exactly at the desired position of the flexible core, e.g. precisely fitting openings having the size of the outer diameter of the flexible core. Such a base plate locks the flexible core in the first position. After filling the first cavity and retracting the flexible core, the base plate can then also be removed from the flexible mold, or it is possible for the second cavity to be filled with the second pasty mass through the openings provided for the flexible core.

In another preferred embodiment of the apparatus according to the invention, the apparatus may further comprise a reducer piece. The reducer piece may be at least partially inserted into the flexible mold from above. The reducer piece may thereby at least partially contact the inner side of the flexible mold. This has the advantage that no pasty mass can penetrate along the contact surface between the flexible mold and the reducer piece, even if the surface of the pasty mass is above the contact surface after the flexible mold and the reducer piece have been filled. In particular, it is possible for the reducer piece to be filled up to about half with pasty mass. The reducer piece can taper the flexible mold, i.e. the inner diameter of the flexible mold can be smaller with the reducer piece in place than without the reducer piece. The reducer piece may be designed with the same spatial symmetry as the flexible shape. For example, if the flexible mold is rotationally symmetric about a vertical axis, the reducer piece may also be rotationally symmetric about that vertical axis. The reducer piece defines, by the volumes it occupies, a recess in the volume of space that can be occupied by the first pasty mass within the flexible mold. This recess may be useful for inserting the lipstick mine into a basket of a known lipstick mechanism without there being a mismatch between the solidified pasty mass and the basket. Also, the recess has the advantage that no material of the first pasty mass would have to be displaced when the basket is put on, which could lead to soiling.

The above-mentioned task is also solved by a method for forming a cosmetic product, in particular a lipstick mine, consisting of at least two pasty masses. Here, the method comprises moving a flexible core into a first position, wherein the flexible core in the first position is at least partially arranged in a flexible mold, filling a first pasty mass into a first cavity, wherein the first cavity is foil led between the flexible mold and the flexible core, moving the flexible core to a second position, the flexible core being arranged outside the flexible mold in the second position, filling a second pasty mass into a second cavity, the second cavity being formed in the first pasty mass when the flexible core is moved to the second position, and deforming the pasty masses. Moving the flexible core into the first position may be performed such that either the flexible core moves towards the flexible mold or the flexible mold moves towards the flexible core. It is also conceivable that the flexible mold and the flexible core move towards each other simultaneously. The filling of a first pasty mass into the first cavity, can for example be done in such a way that a previously defined amount of hot, liquid first pasty mass is filled into the cavity. However, it is also conceivable that the amount of first pasty mass is determined during filling, for example by interrupting a mass flow of filled first pasty mass as soon as it exceeds a predetermined limit value. Measuring the mass flow of the first pasty mass can be done by a flow counter, which indicates the amount of first pasty mass already filled. It can then also be said that the first pasty mass is metered. Moving the flexible core to the second position can be done in such a way that the movement performed when moving the flexible core to the first position is performed in exactly the opposite direction. However, it is also possible that moving the flexible core to the second position comprises moving the flexible core to a parking position, outside the flexible mold. As with the movement of the flexible core into the first position, it is possible that the flexible core alone, the flexible mold alone, or both move simultaneously. In addition, it is conceivable that the movement of the flexible core to a second position occurs initially with very low acceleration so as not to damage the solidified first pasty mass when the flexible core is retracted. In particular, it is conceivable that the movement of the flexible core to the second position is interrupted as soon as an excessive force has to be overcome. Such a situation may occur if the flexible core becomes stuck or jammed with the first pasty mass. In this case, it is possible that the flexible core is first rotated around its longitudinal axis before moving to the second position in order to detach it from the solidified first pasty mass. The filling of the second pasty mass into the second cavity can also be done by a pouring filling. It is also possible that a second means for filling is introduced into the second cavity. Many different possibilities of pouring mechanisms are known to the person skilled in the art.

In a preferred embodiment of the method according to the invention, the method may further comprise applying positive pressure to the flexible core before filling the first pasty mass and applying negative pressure, i.e. vacuum, to the flexible core prior to moving it to the second position. Applying positive pressure to the flexible core allows it to expand, whereas applying negative pressure to the flexible core causes it to contract. Thus, before filling the first pasty mass, the flexible core can be expanded in such a way that its volume corresponds to the desired shape of the first and second cavities. After filling the first pasty mass into the first cavity, the flexible core can be contracted such that it has a smaller volume than the second cavity and can therefore be easily detached from the solidified first pasty mass and moved out of the flexible mold without destroying the first pasty mass.

In a preferred embodiment of the method according to the invention, the method may further comprise, at least partially, inserting a reducer piece into the flexible mold prior to filling the first pasty mass. Further, the method may comprise, prior to deforming the solidified pasty masses, removing the reducer piece from the flexible mold. The reducer piece may also be removed after the first pasty mass has solidified, i.e. before the second pasty mass is filled.

BRIEF DESCRIPTION OF THE DRAWINGS

The invention will now be explained in more detail with reference to the accompanying figures. From these, further details and features of the subject-matter of the invention will be apparent. The figures show the following.

DETAILED DESCRIPTION

Figure 1A:
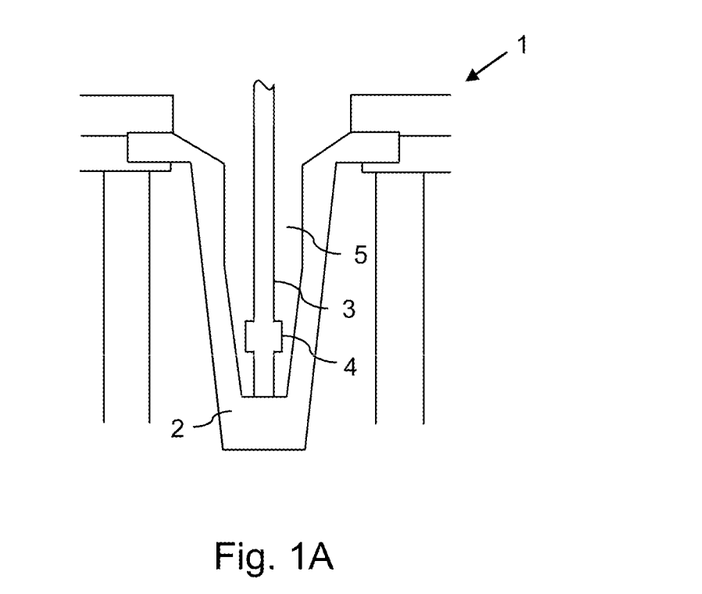
FIG. 1A shows a vertical cross section through an apparatus according to the invention with a flexible mold and a flexible core, which is in a first position.

FIG. 1A shows schematically a vertical cross section through an embodiment example of an apparatus 1 according to the invention with a flexible mold 2 and a flexible core 3, which is in a first position. The flexible mold 1 interacts with the flexible core 3 to form a first cavity 5, which is defined by the space between the flexible mold 2 and the flexible core 3. The flexible mold 2 may be made of an elastomer. It is conceivable that the flexible mold 2 is preheated before filling the first cavity 5. This ensures an optimal flow of the first pasty mass into the first cavity 5. For example, the flexible mold 2 can be preheated to 30° C. to 60° C. (86° F. to 140° F.). The flexible core 3 may be made of an elastomer and may be hollow. The flexible core 3 may comprise a pattern 4 applied to its surface. This pattern 4 may be formed by a recess (not shown) or by a protrusion, as shown in FIG. 1. In particular, the flexible core 3 may come into contact with the flexible mold 2. In the present figure, this contact takes place at the base of the flexible mold 2.

Figure 1B:
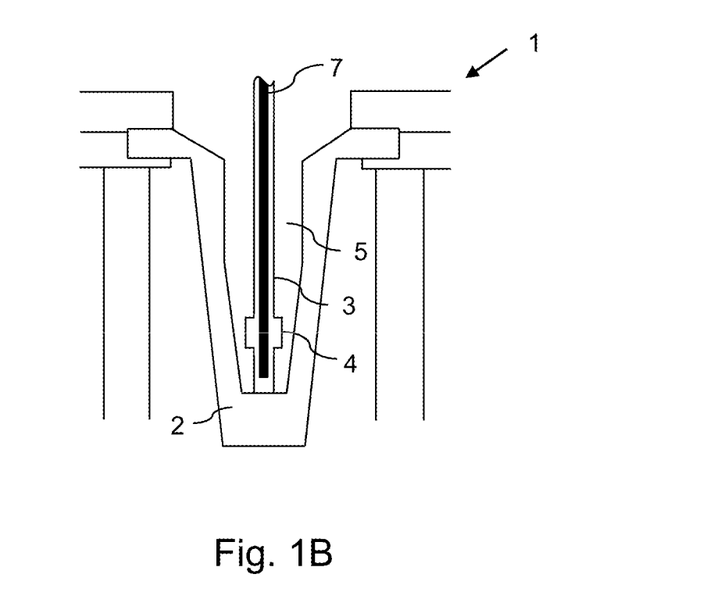
FIG. 1B shows a vertical cross section through an apparatus according to the invention with a flexible mold and a flexible core, which is in a first position together with a support mandrel.

FIG. 1B additionally or alternatively shows a support mandrel 7 over which the flexible core 3 is slid. One can also say that the flexible core 3 forms a sheet for the support mandrel 7. For this purpose, the flexible core 3 can be hollow on the inside so that it can accommodate the support mandrel 7. The support mandrel 7 provides stability for the flexible core 3 when the first pasty mass is filled in and holds the flexible core 3 in the first position. The person skilled in the art is aware that a support mandrel is not always necessary, and that this depends, for example, on the choice of material of the flexible core 3 or its design. If the support mandrel 7 is used, it is preferably made of a material which is stronger than the flexible core 3, so as to be able to provide sufficient structural stability.

The structural stability of the flexible core 3 can be achieved by selecting the material of the flexible core 3 itself, by using an additional support mandrel 7 and/or by applying a positive pressure to the flexible core 3. In the latter case, for example, the flexible core 3 may be hollow on the inside and a positive pressure may be created in the volume defined by the hollow space, either by filling it with a gas or a liquid that provides some stability to the flexible core 3. This positive pressure can then also ensure that the first pasty mass (a) to be filled in does not deform the flexible core 3. The internal pressure thus counteracts the external pressure. This pressure can be generated both in the flexible core 3 shown in FIG. 1A and in the flexible core 3 shown in FIG. 1B. In the latter case, the pressure can be generated in the volume between the inner wall of the flexible core 3 and the support mandrel 7.

The pasty masses (a), (b) are brought into a liquid state before filling. For this purpose, the pasty masses (a), (b) must be brought to a temperature which causes all the component compounds of the pasty masses (a), (b) to melt in order to permit lump-free flow and solidification of the pasty masses (a), (b). The pasty masses (a), (b) must be heated to a temperature which causes all the component compounds of the pasty masses (a), (b) to melt. Typically, the heating temperature of the pasty masses is 70° C. to 80° C. (158° F. to 176° F.), since in many cases the pasty masses are wax-like compounds.

Figure 2A:
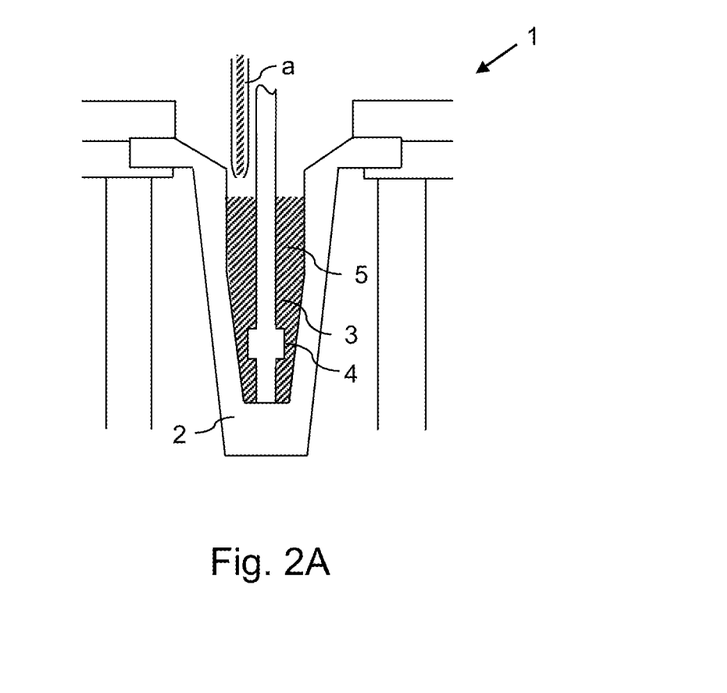
FIG. 2A shows the apparatus shown in FIG. 1A after filling the first pasty mass.

In FIG. 2A, the apparatus 1 is shown after filling the first pasty mass (a) into the first cavity 5. Here, the first cavity 5 is completely filled by the first pasty mass (a). In order to ensure a uniform distribution of the first pasty mass (a) in the first cavity 5, it is conceivable that the means for filling is designed in such a way that the filling tip of the first pasty mass (a) rotates about the vertical axis of symmetry of the flexible core 3 during filling. After filling the first pasty mass (a), the pattern 4 is imprinted in the first pasty mass (a) in mirror image of its expression on the flexible core 3. The structural stability of the flexible core 3 in FIG. 2A is provided, for example, by applying a positive pressure to the flexible core 3, or by the choice of material of the flexible core 3.

Figure 2B:
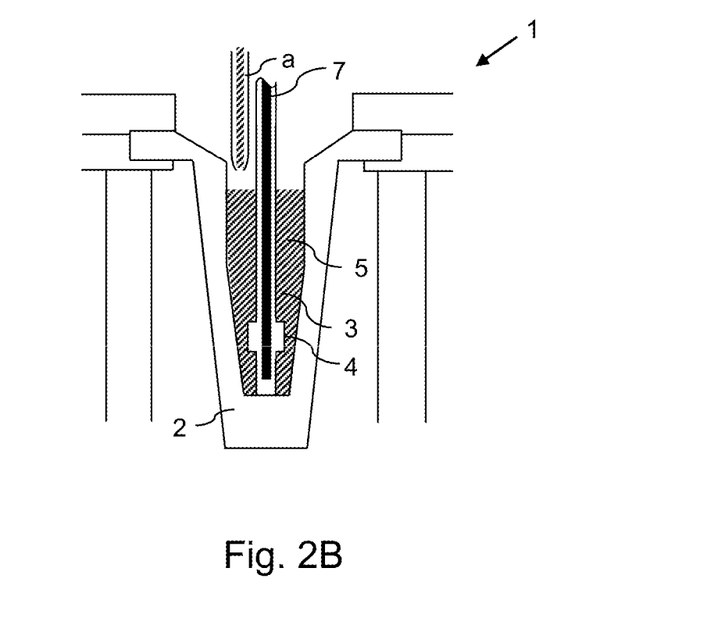
FIG. 2B shows the apparatus shown in FIG. 1B after filling the first pasty mass.

FIG. 2B also shows the apparatus 1 after filling the first pasty mass (a) into the first cavity 5. Here, however, the support mandrel 7, which is located inside the flexible core 3, is also shown.

Figure 3A:
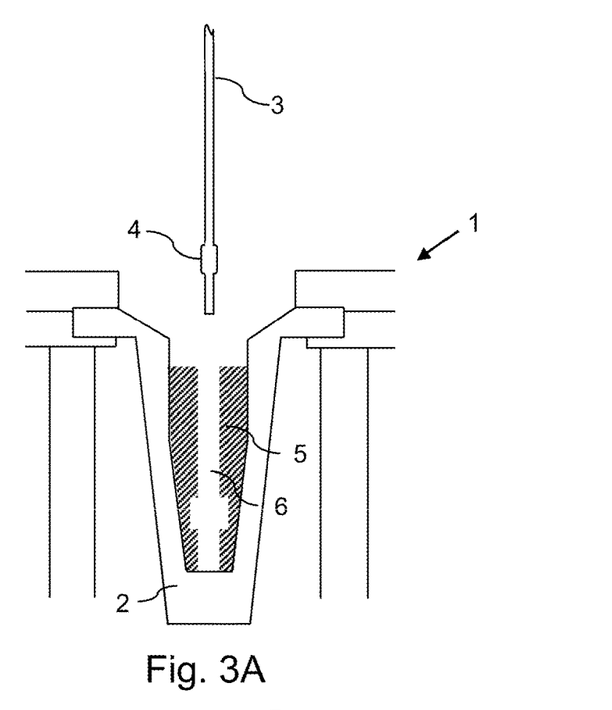
FIG. 3A shows the apparatus shown in FIG. 2A after moving the flexible core to a second position.

In FIG. 3A, the apparatus 1 is schematically shown after moving the flexible core 3 into a second position. The flexible core 3 has reduced its volume, for example by applying a negative pressure or by sucking off the filled liquid, so that the flexible core 3 could be moved upwards without damaging the solidified first pasty mass (a) in the first cavity 5. The flexible core 3 moved to the second position leaves a second cavity 6 corresponding to the outer volume of the flexible core 3 when the first cavity 5 was filled with the first pasty mass (a). It can also be said that the second cavity 6 has the shape of the flexible core 3.

Figure 3B:
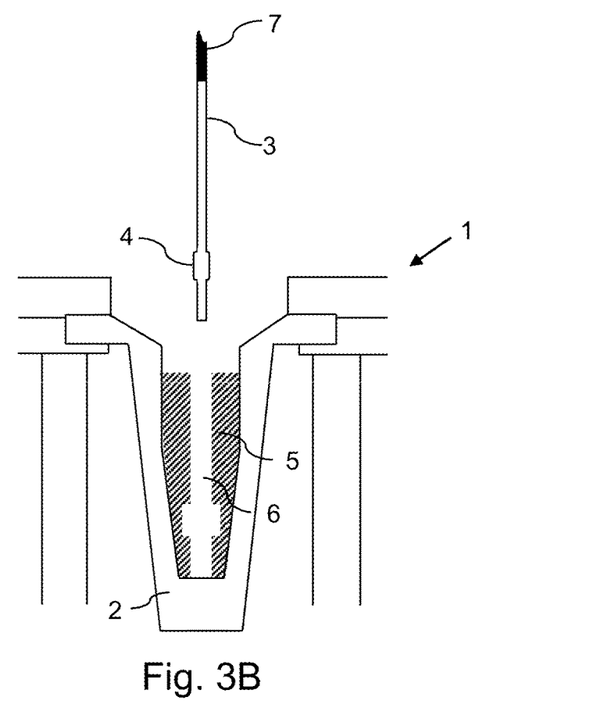
FIG. 3B shows the apparatus shown in FIG. 2B after moving the flexible core to a second position.

In FIG. 3B, it is shown that the support mandrel 7 can be retracted from the flexible core 3. In the retracted state of the support mandrel 7, an internal volume of the flexible core 3 is exposed which was previously filled by the support mandrel 7. This allows the flexible core 3 to deform freely and to be pulled out of the first pasty mass (a) without damaging it. It is also conceivable that the deformation of the flexible core 3 is further assisted by the fact that there is an opening in the support mandrel 7, by means of which a negative pressure can be applied in the freed volume of the flexible core 3 so that it contracts.

Figure 4:
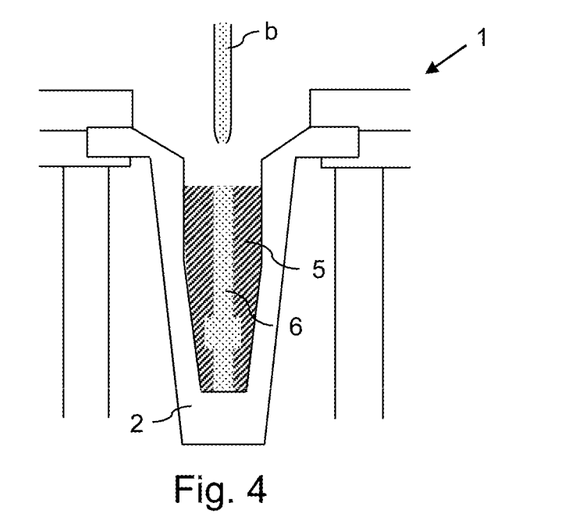
FIG. 4 shows the apparatus shown in FIG. 3A/B after filling the second pasty mass.

In FIG. 4, the apparatus 1 is shown after filling the second pasty mass (b) into the second cavity 6. Here, the second pasty mass (b) completely fills the second cavity 6, including the imprinting of the pattern 4 in the solidified first pasty mass (a). In other words, the solidified second pasty mass (b) has a volumetric shape corresponding to the outer volume of the flexible core 3 when the first cavity 5 is filled with the first pasty mass (a), as shown in FIG. 2. After cooling of the pasty masses (a), (b), a composite is formed from the two solidified pasty masses (a), (b). If the first pasty mass (a) is at least partially transparent, the pattern 4 thus appears as visible from the outside, but is embedded in a deeper layer of the lipstick mine. The second pasty mass can be filled in as soon as the first pasty mass has at least partially solidified. Complete solidification of the first pasty mass does not have to be waited for in order to start filling in the second pasty mass. This achieves an increased fabrication speed of the composite of the first and second pasty masses. Also, if the first pasty mass has not yet completely solidified, it may be advantageous to fill in the second pasty mass to generate an appropriate composite of the pasty masses.

Figure 5:
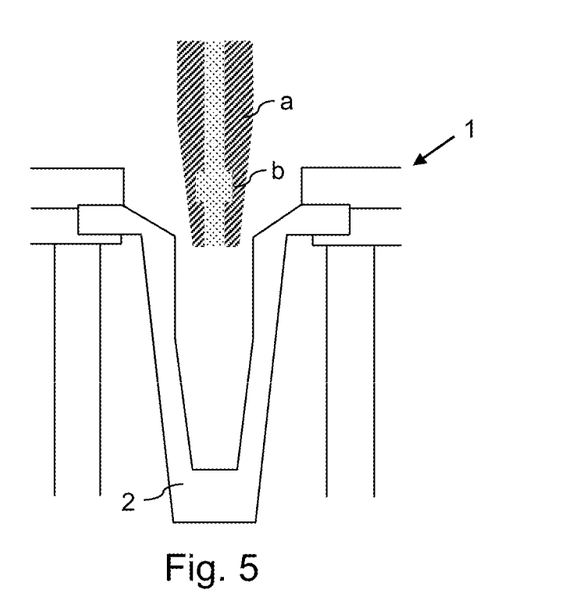
FIG. 5 shows the apparatus shown in FIG. 4 after deforming the pasty masses.

Finally, FIG. 5 shows the apparatus 1 after deforming the pasty masses (a), (b) from the flexible mold 2. In order to remove the composite of the solidified pasty masses (a), (b) from the flexible mold 2 as damage-free as possible, the deforming can be carried out by pulling back exactly vertically, without horizontal displacement.

Figure 6:
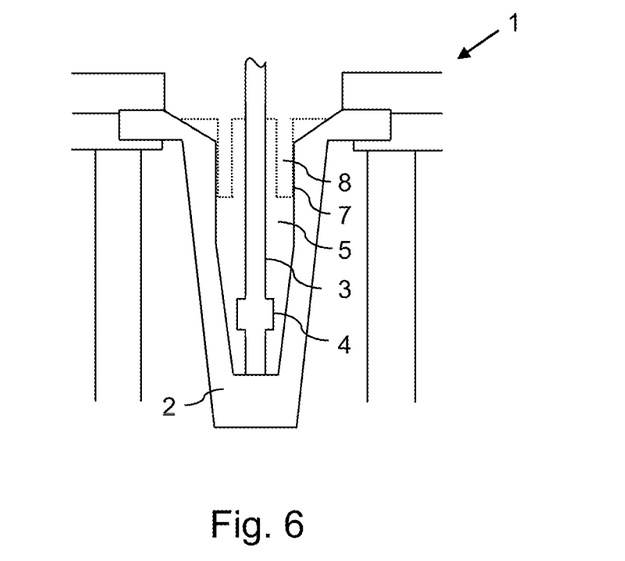
FIG. 6 shows the apparatus shown in FIG. 1 with the reducer piece attached.

FIG. 6 shows a section through the apparatus 1 before filling the pasty masses with an attached reducer piece 7, as described above. The dimensions of the reducer piece 7 are shown as dashed lines in FIG. 6 to better distinguish them from the dimensions of the flexible mold 2. The reducer piece 7 is flush with the flexible mold 2 along a contact surface. Thereby, the reducer piece 7 defines recesses 8 in the first cavity 5, which is filled with a first pasty mass. The reducer piece 7 may have the same symmetry as the flexible mold 2. For example, if the flexible mold 2 is rotationally symmetric about the vertical axis through the center of the flexible core 3, the reducer piece 7 may also be rotationally symmetric about this axis. In this case, the recesses 8 are also rotationally symmetric about the vertical axis. The reducer piece 7 may be configured to correspond to up to one-third of the longitudinal extent of the flexible mold 2 and have an outer diameter approximately equal to the inner diameter of the flexible mold 2. If the flexible mold 2 has an annular cross-section, the reducer piece 7, at least the part that is inserted into the flexible mold 2, may also have an annular cross-section. The reducer piece 7 thus reduces the diameter of the flexible mold 2, resulting in a reduction in the cavity that can be filled with the first pasty mass (a).

Figure 7A:
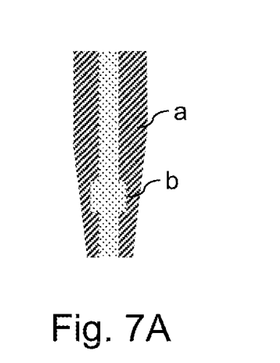
FIG. 7A shows the deformed pasty masses after deforming from an apparatus according to the invention without reducer piece.
Figure 7B:
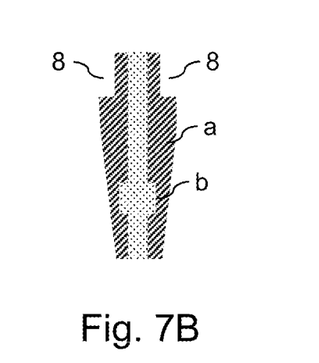
FIG. 7B shows the deformed pasty masses after deforming from an apparatus according to the invention with reducer piece.

FIG. 7 shows the deformed pasty masses after deforming from an apparatus according to the invention without reducer piece (FIG. 7A) and with reducer piece (FIG. 7B). The reducer piece indicated in FIG. 6 leaves the recesses 8 in the solidified first pasty mass (a), as shown in FIG. 7B. The extension and shape of these recesses 8 is complementary to the shape of the reducer piece 7. The recesses 8 may correspond in their dimensions and shape, for example, to the dimensions of a receiving apparatus (basket) of a lipstick mechanism. In addition, it is possible for the recesses 8 themselves to be filled with an additional pasty mass.

The invention claimed is:

1. An apparatus (1) for forming a cosmetic product, consisting of at least two pasty masses (a, b), the apparatus (1) comprising:
    a flexible mold (2);
    a flexible core (3) adapted to be moved into the flexible mold (2) and to be arranged in a first position at least partially inside the flexible mold (2) for forming a first pasty mass (a) and in a second position outside the flexible mold (2) for forming a second pasty mass (b), wherein the flexible mold (2) is hollow; and
    a rigid mandrel (7) adapted to be moved at least partially into the flexible core (3).

2. The apparatus (1) according to claim 1, wherein the flexible core (3) is adapted to be subjected to positive pressure or negative pressure, wherein the flexible core (3) expands when subjected to positive pressure and contracts when subjected to negative pressure.

3. The apparatus (1) according to claim 1, wherein the flexible core (3) comprises a pattern (4) on an outer wall, wherein the pattern (4) is formed by at least one recess in the flexible core (3) and/or by at least one protrusion.

4. The apparatus (1) according to claim 1, wherein the flexible core (3) in the first position contacts the flexible mold (2) at least at one location.

5. The apparatus (1) according to claim 1, wherein the flexible core (3) is formed of an elastomer that is slid over a support mandrel (7) of metal or plastic.

6. The apparatus (1) according to claim 5, wherein there is an annular gap between the support mandrel (7) and the flexible core (3).

7. The apparatus (1) according to claim 1, further comprising:
    means for filling a first pasty mass (a) into a first cavity (5), wherein the first cavity (5) is formed between the flexible mold (2) and the flexible core (3) when the flexible core (3) is in the first position.

8. The apparatus (1) according to claim 7, further comprising:
    means for filling a second pasty mass (b) into a second cavity (6), wherein the second cavity (6) is formed in the first pasty mass (a) when the flexible core (3) is in the second position.

9. The apparatus (1) according to claim 1, further comprising:
    means for deforming the pasty masses (a, b).

10. A method for forming a cosmetic product, consisting of at least two pasty masses (a, b), the method comprising:
    moving a flexible core (3) into a first position, wherein the flexible core (3) in the first position is at least partially arranged inside a flexible mold (2), wherein the flexible mold is hollow (2);
    moving a rigid mandrel (7) at least partially into the flexible core (3);
    filling a first pasty mass (a) into a first cavity (5), wherein the first cavity (5) is formed between the flexible mold (2) and the flexible core (3) when the flexible core (3) is in the first position;
    moving the rigid mandrel (7) and the flexible core (3) to a second position, wherein the rigid mandrel (7) and the flexible core (3) is arranged outside the flexible mold (2) in the second position;
    filling a second pasty mass (b) into a second cavity (6), wherein the second cavity (6) is formed in the first pasty mass (a) when the flexible core (3) is moved to the second position; and deforming the pasty masses (a, b) from the flexible mold (2).

11. The method according to claim 10, further comprising centering and fixing of the flexible core (3).

12. The method according to claim 10, further comprising:
    applying positive pressure to the flexible core (3) before filling the first pasty mass (a); and
    applying negative pressure to the flexible core (3), prior to moving it to the second position.

* * * * *